United States Patent [15] 3,655,997
O'Daniel et al. [45] Apr. 11, 1972

[54] COMPLEMENTARY DRIVER CIRCUIT FOR DIODE DIGITAL PHASE SHIFTERS

[72] Inventors: Stephen A. O'Daniel; Murray H. Mott; Robert W. Jones, all of San Diego, Calif.

[73] Assignee: The United States of America as represented by the Secretary of the Navy

[22] Filed: Oct. 23, 1970

[21] Appl. No.: 83,556

[52] U.S. Cl. ..............................307/210, 307/242, 307/244, 307/262, 307/270, 307/317, 328/155
[51] Int. Cl. ..........................................................H03k 19/12
[58] Field of Search ..................307/210, 242, 244, 262, 270, 307/317; 328/155

[56] References Cited

UNITED STATES PATENTS 3,359,433 12/1967 Thauland ............................307/262 X
3,475,700 10/1969 Ertel .................................307/244 X

OTHER PUBLICATIONS

Poulet; Microcircuit Ring Modulator, IBM Technical Disclosure Bulletin, April 1965, pp. 1096, 1097.

*Primary Examiner*—Stanley T. Krawczewicz
*Attorney*—R. S. Sciascia, George J. Rubens and J. W. McLaren

[57] ABSTRACT

A solid state complementary circuit for driving PIN diode digital phase shifters wherein PIN diodes are used to digitally switch in or switch out phase increments or bits. The driver circuit essentially comprises an emitter-coupled PNP transistor pair for each phase bit of the phase sifter. The transistor pairs are operable in response to digital logic control signals to provide complementary outputs which in one state switch in a selectively predetermined phase bit and in the opposite state switch out the phase bit.

1 Claims, 1 Drawing Figure

Patented April 11, 1972
3,655,997
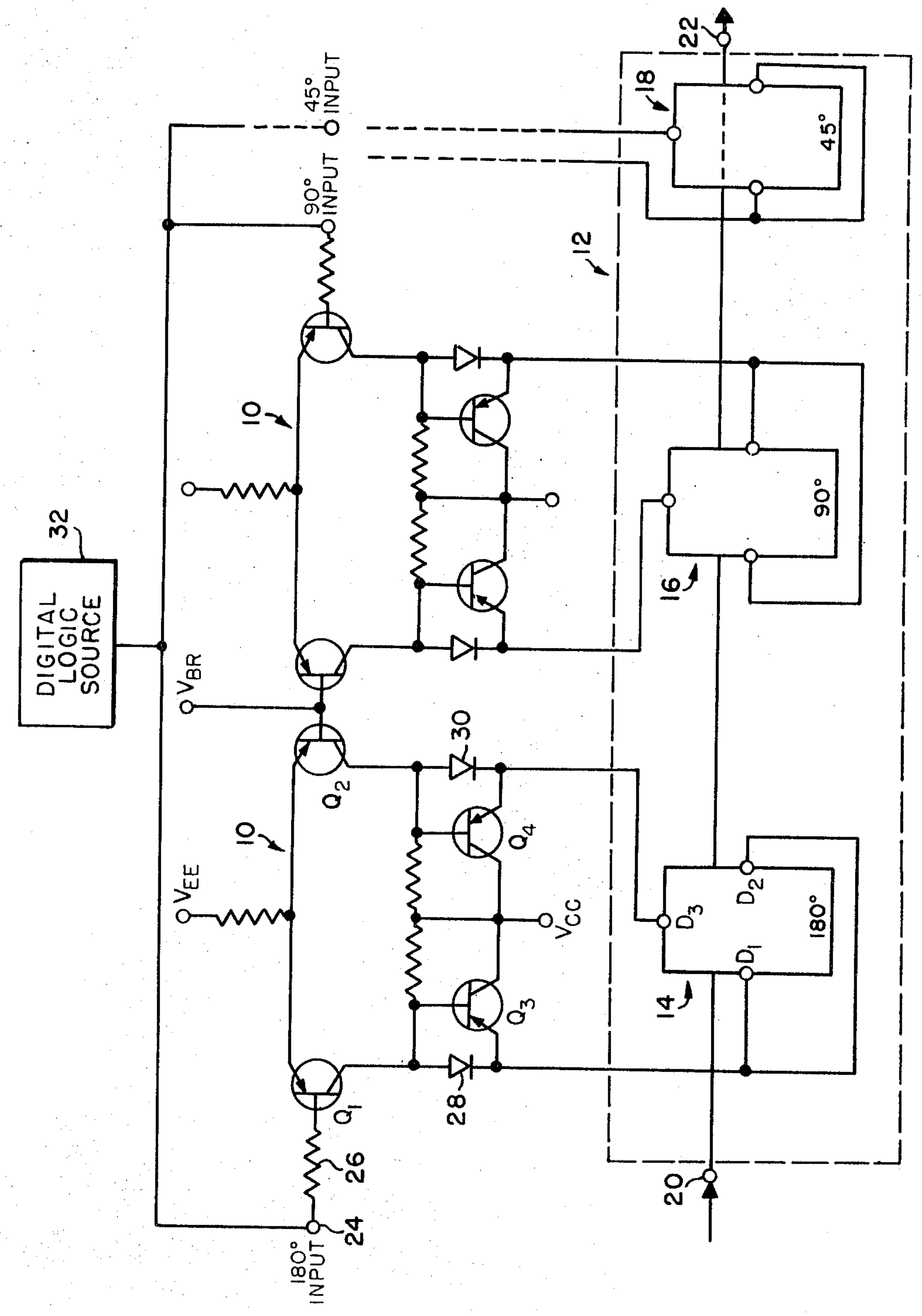
INVENTORS
STEPHEN A. O'DANIEL
MURRAY H. MOTT
ROBERT W. JONES
BY
George J. Rubens

COMPLEMENTARY DRIVER CIRCUIT FOR DIODE DIGITAL PHASE SHIFTERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Three-dimensional, cylindrical, phased-array radars present unique control requirements. An antenna of the type used with such radars can comprise, for example, 1408 active elements arranged in four columns of 32 elements, each disposed symmetrically along the generators of a cylindrical surface. Each active element has associated therewith a PIN diode digital phase shifter having bit sizes of, for example, 180°, 90°, 45°, and 22.5°. By adding the bits in all possible combinations, phase stepping can be achieved.

In general, energy incident upon the antenna from a particular direction excites each receiving element with a different phase. Consequently the phase shifters are used to equalize the output phases of all the elements whereby summation will provide maximum signal amplitude. Thus the correct setting of the phase shifters can place the direction of maximum response (beam position) anywhere within a fairly large sector.

Furthermore since each beam that is formed requires a different setting for each of the 1408 phase shifters it can be appreciated that even modest beam agility requires some form of automatic control. The present invention comprises a practical, effective and relatively simple solid state circuit which can be used to automatically drive diode digital phase shifters used in phased-array radars.

SUMMARY OF THE INVENTION

A solid state complementary circuit for driving digital phase shifters wherein PIN diodes are used to digitally switch in or switch out phase increments or bits of phase shift. The novel driver circuit essentially comprises a plurality of PNP transistor pairs which are emitter coupled with respect to each other. Each pair is operable in response to digital control signals to provide complementary switching outputs to a different phase bit of the phase shifter whereby phase increments or bits of phase shift can be selectively switched in or out in the phase shifter. The driver circuit can be used to advantage with phased-array radars wherein PIN diode digital phase shifters are used to digitally phase shift microwave energy.

OBJECT OF THE INVENTION

It is the primary object of the present invention to provide a solid state complementary circuit for driving PIN diode digital phase shifters.

It is another object of the present invention to provide a relatively simple and inexpensive solid state driver circuit for driving PIN diode digital phase shifters used with phased-array radars.

Other objects, advantages and novel features of the invention will become apparent from the following detailed description of the invention when considered in conjunction with the accompanying drawings wherein:

BRIEF DESCRIPTION OF THE DRAWINGS

The figure is a simplified schematic representation of the novel solid state complementary circuit for driving PIN diode digital phase shifters.

DESCRIPTION OF THE PREFERRED EMBODIMENT

In the figure, two driver circuits 10 embodying the novel concept to be disclosed herein are shown connected to a pin diode digital phase shifter 12 of the type disclosed and fully described by R. W. Burns in "PIN Diodes Advance High Power Phase Shifting", MICROWAVE, Volume 4, pp. 38–48, Nov. 1965.

The phase shifter 12 essentially comprises a three-bit phase shifter consisting of the phase bits 14, 16, and 18. Phase bits 14, 16, and 18 can, for example, comprise 180°, 90°, and 45° phase bits. Phase bit 14 comprises two line-length paths for received microwave energy.

As discussed in the Burns' publication, if the PIN diodes $D_1$ and $D_2$ are reverse-biased and $D_3$ is forward-biased, input microwave energy received at input terminal 20 travels the path from diode $D_1$ to diode $D_2$ and on towards phase bit 16 with a 180° phase shift. If diodes $D_1$ and $D_2$ are forward-biased and $D_3$ is reverse-biased, input microwave energy travels the path from input terminal 20 to diode $D_3$ and on towards phase bit 16 with substantially no phase shift. The same procedure is repeated in the other phase bits 16 and 18 which provide an output signal at the terminal 22.

Associated with and connected to each phase bit is a novel driver circuit 10 embodying the present inventive concept. It should be understood that the driver circuits 10 are identical in structure and operation; hence, a driver circuit 10 is not shown connected to phase bit 18 and thus the structure and operation of only the driver circuit connected to phase bit 14 will be described. It should further be understood that the driver circuit 10 associated with the 90° phase bit 16 is connected in a mirror-image relationship with respect to the driver circuit associated with the 180° phase bit 14.

The driver circuits 10 consist essentially of a pair of PNP transistors $Q_1$ and $Q_2$ which are connected in an emitter coupled relationship with respect to each other. A power supply voltage source $V_{EE}$ is shown connected to the emitter junction of the transistors $Q_1$ and $Q_2$. The driver circuit 10 has an input terminal 24 which receives digital control signals from a digital logic source 32 and couples the signals to the transistors $Q_1$ and $Q_2$ through the input resistor 26. The collector of the transistor $Q_1$ is connected through a diode 28 to the PIN diodes $D_1$ and $D_2$ of the phase shifter 14. Likewise, the collector of the transistor $Q_2$ is connected through a diode 30 to the PIN diode $D_3$ of the phase shifter 14. It should be noted that transistor $Q_1$ is connected in a common-emitter configuration whereas transistor $Q_2$ is connected in a common-base configuration. The two diodes 28 and 30 function to provide control voltages for the transistors $Q_3$ and $Q_4$ in a manner to be described hereinafter.

Connected across the collectors of the transistors $Q_1$ and $Q_2$ are two PNP transistors $Q_3$ and $Q_4$ which are collector coupled with respect to each other. The diodes 28 and 30 are connected between the base and the emitter of the transistors $Q_3$ and $Q_4$, respectively. The collectors of $Q_3$ and $Q_4$ are connected to a power supply voltage $V_{cc}$ whereby $Q_3$ and $Q_4$ function as a bias voltage source for providing a reverse bias voltage to the diodes $D_1$, $D_2$ and $D_3$ in a manner to be described hereinafter.

Connected to the base of the transistor $Q_2$ is a base reference voltage $V_{BR}$. A second driver circuit identical to the one just described is also coupled to the voltage $V_{BR}$.

It can be appreciated from the figure that in the phase bit 14, the PIN diodes $D_1$, $D_2$ and the pin diode $D_3$ require complementary control for phase shifting purposes. That is, if the diodes $D_1$ and $D_2$ are reverse-biased, the diode $D_3$ must be forward-biased whereby a long delay path or 180° phase shift is produced. The diodes are physically located a distance equivalent to a quarter wave-length from the T junctions of the phase bit whereby the low impedance of a conducting diode is transformed into a high impedance at the T junction.

Assume that a logic "0" control signal is applied at the input terminal 24 from the digital logic source 32 whereby the transistor $Q_1$ is switched "on" to a conducting state. The resulting common emitter voltage developed reaches a value sufficient to maintain the transistor $Q_2$ in an "off" state. Simultaneously transistor $Q_1$ delivers a drive current to the PIN diodes $D_1$ and $D_2$ whereby they are switched "on".

The current through the diode 28 which is conducting develops a reverse bias from the base to the emitter of the transistor $Q_3$ whereby $Q_3$ is maintained in an "off" state. Since the diode 30 is not conducting, the transistor $Q_4$ thereby provides a low impedance path from the power supply voltage $V_{cc}$ to the anode of the PIN diode $D_3$.

If a logic "1" control signal is applied at the input terminal 24, the transistor $Q_2$ is switched to an "off" state. The resulting common emitter voltage developed then switches the transistor $Q_2$ to an "on" state and $Q_1$ delivers a drive current to the PIN diode $D_3$ whereby it is switched "on". The voltage developed across the diode 30 switches the transistor $Q_4$ to an "off" state and since the diode 28 is not conducting, the transistor $Q_3$ applies a reverse bias to the PIN diodes $D_1$ and $D_2$ in the phase shifter and switches them "off".

Simultaneously with the operation of the driver circuit of the 180° phase bit, the driver circuits of the 90° and the 45° phase bits would likewise be controlled by digital signals from the digital logic source 32.

Thus it can be appreciated that a new and novel driver circuit for use with PIN diode digital phase shifters which can be used to advantage with phased array radars has been disclosed. The driver circuit essentially comprises a simple solid state circuit which operates in a complementary fashion to provide drive current to PIN diodes in the phase bits of the phase shifters.

Obviously many modifications and variations of the present invention are possible in the light of the above teachings. It is therefore to be understood that within the scope of the appended claims the invention may be practiced otherwise than as specifically described.

What is claimed is:

1. A solid state driver circuit for driving PIN diode digital phase shifters of the type which require complementary digital control signals comprising:

a first PNP transistor in a common emitter configuration;

a second PNP transistor in a common base configuration;

said first and second PNP transistors being connected to each other in an emitter-coupled manner;

an input terminal;

said input terminal being connected to the base of said first PNP transistor and being adapted to receive digital control signals;

a third and a fourth PNP transistor in a common collector configuration;

said third and fourth PNP transistors being connected across the collectors of said first and second PNP transistors and further being connected to each other in a collector-coupled manner;

each of said third and fourth PNP transistors having a diode connected between its emitter and base;

a negative power supply voltage being connected to the collectors of said third and fourth PNP transistors;

the collectors of said first and second PNP transistors being connected through said diodes to different PIN diodes in said digital phase shifters;

whereby the application of selectively predetermined digital control signals at said input terminal produces complementary outputs at said different PIN diodes.

* * * * *